United States Patent
Schlemm et al.

(10) Patent No.: US 12,439,954 B2
(45) Date of Patent: Oct. 14, 2025

(54) METHOD AND DEVICE FOR IDENTIFYING CAPSULE DEFECTS IN A FILTER OF THE TOBACCO PROCESSING INDUSTRY

(71) Applicant: TEWS Elektronik GmbH & Co. KG, Hamburg (DE)

(72) Inventors: Udo Schlemm, Hamburg (DE); Jörn Eggers, Quickborn (DE)

(73) Assignee: TEWS ELEKTRONIK GMBH & CO. KG, Hamburg (DE)

( * ) Notice: Subject to any disclaimer, the term of this patent is extended or adjusted under 35 U.S.C. 154(b) by 236 days.

(21) Appl. No.: 18/035,818

(22) PCT Filed: Oct. 27, 2021

(86) PCT No.: PCT/EP2021/079812
§ 371 (c)(1),
(2) Date: May 8, 2023

(87) PCT Pub. No.: WO2022/101010
PCT Pub. Date: May 19, 2022

(65) Prior Publication Data
US 2023/0404133 A1    Dec. 21, 2023

(30) Foreign Application Priority Data

Nov. 11, 2020  (EP) .............................. 102020129732

(51) Int. Cl.
*A24C 5/18* (2006.01)
*A24C 5/34* (2006.01)
*A24D 3/02* (2006.01)
*G01N 22/02* (2006.01)
*G01N 22/04* (2006.01)

(52) U.S. Cl.
CPC .......... *A24C 5/3412* (2013.01); *A24C 5/1814* (2013.01); *A24C 5/1821* (2013.01);
(Continued)

(58) Field of Classification Search
CPC ....... A24C 5/18; A24C 5/1814; A24C 5/1821; A24C 5/1892; A24C 5/34; A24C 5/3412;
(Continued)

(56) References Cited

U.S. PATENT DOCUMENTS

2014/0131579 A1* 5/2014 Ademe ................ A24C 5/3412
                                                                250/353

FOREIGN PATENT DOCUMENTS

CN      105866140 A   *  8/2016   ............. G01B 15/00
CN      110279142 A      9/2019
(Continued)

OTHER PUBLICATIONS

PCT/EP2021/078912, International Search Report and Written Opinion, Date of Mailing Feb. 1, 2022 (10 pages).
(Continued)

*Primary Examiner* — Douglas X Rodriguez
*Assistant Examiner* — Kendrick X Liu
(74) *Attorney, Agent, or Firm* — Barclay Damon LLP

(57) ABSTRACT

A method for identifying capsule defects in a tobacco filter includes measuring values for density and/or moisture content of the filter using a microwave measurement device. The measured values are compared with a threshold value and a presence of a capsule defect in the filter is determined if the measured valued undershoots the threshold value. A value for a degree of fluctuation of the measured values is determined at a region in front of a measurement location and/or behind the measurement location in which at least one measured value is below the threshold value. The value for the degree of fluctuation is compared with a predetermined capsule threshold value. The capsule defect comprises a broken capsule when the value for the degree of fluctuation exceeds the capsule threshold value, and the capsule defect comprises a missing capsule when the value
(Continued)

for the degree of fluctuation undershoots the capsule threshold value.

16 Claims, 5 Drawing Sheets

(52) U.S. Cl.
CPC .......... *A24C 5/1892* (2013.01); *A24D 3/0216* (2013.01); *A24D 3/0295* (2013.01); *G01N 22/02* (2013.01); *G01N 22/04* (2013.01)

(58) Field of Classification Search
CPC ...... A24D 3/02; A24D 3/0212; A24D 3/0216; A24D 3/0295; G01N 22/02; G01N 22/04
See application file for complete search history.

(56) References Cited

FOREIGN PATENT DOCUMENTS

| | | | |
|---|---|---|---|
| EP | 2 207 027 | A2 | 7/2010 |
| EP | 2 249 670 | | 11/2010 |
| EP | 2 796 061 | A1 | 10/2014 |
| EP | 2 873 334 | A1 | 5/2015 |
| IT | 2012BO00394 | A1 | 1/2014 |
| JP | 2010252792 | A | 11/2010 |
| JP | 2010252792 | A5 | 5/2013 |
| WO | 2009/099793 | A2 | 8/2009 |

OTHER PUBLICATIONS

PCT/EP2021/078912, English translation of International Search Report, Date of Mailing Feb. 1, 2022 (3 pages).

PCT/EP2021/078912, English translation of International Preliminary Report on Patentaility, Date of Mailing Nov. 21, 2022 (6 pages).

Japanese Patent Office; Japanese Office Action; Application No. JP 2023527679, Filed Jun. 2, 2020, Notification of Reason(s) for Refusal, Drafting Date Aug. 28, 2024 (4 pages).

Japanese Patent Office; Japanese Office Action(English Translation); Application No. JP 2023527679, Filed Jun. 2, 2020, Notification of Reason(s) for Refusal, Drafting Date Aug. 28, 2024 (3 pages).

\* cited by examiner

METHOD AND DEVICE FOR IDENTIFYING CAPSULE DEFECTS IN A FILTER OF THE TOBACCO PROCESSING INDUSTRY

CROSS REFERENCE TO RELATED INVENTION

This application is a national stage application pursuant to 35 U.S.C. § 371 of International Application No. PCT/EP2021/079812, filed on Oct. 27, 2021, which claims priority to, and benefit of, German Patent Application No. 10 2020 129 732.7, filed Nov. 11, 2020, the entire contents of which are hereby incorporated by reference.

TECHNOLOGICAL FIELD

The present disclosure relates to a method and to a device for identifying capsule defects in a filter of the tobacco processing industry.

BACKGROUND

Filters of the tobacco processing industry can be in the form of a filter strand, cut filter rods, or as a filter piece connected to a cigarette. For taste reasons, capsules with flavoring substances are incorporated into the filter, which capsules are crushed in the filter immediately before the cigarette is smoked, thus releasing their flavoring substances in the filter. A commonly used flavoring substance is menthol, for example. The advantage of using a filter of this kind with one or more capsules incorporated therein is that the flavoring substances are already located in the filter and are not combusted together with the tobacco, but rather added to the tobacco smoke uncombusted. The formation of substances that are harmful to health due to the combustion of the flavoring substances is thus prevented. Likewise, alteration of the flavoring by means of combustion with the tobacco is excluded.

Various parameters of the capsules can be measured with suitable sensor systems during manufacture and/or during inspection of the final product and their quality can be monitored. The parameters relevant here for the capsules are, for example, their position and their spacing in the filter as well as their condition, i.e. whether the capsules are intact or damaged.

EP 2 249 670 discloses various sensor systems for inspecting capsules which can detect the condition and presence of the capsules in the filter strand. EP 2 207 027 discloses a method for measuring the mass or density and/or for measuring the moisture content in a large number of portioned units in a non-metallic substrate. A microwave measurement device consisting of at least one microwave resonator for generating at least one resonance mode measures in a locally limited measuring range. The microwave measurement device measures at least one characteristic variable of the resonance mode in each case if only the substrate is located in the measuring range without a portioned unit and if the portioned unit is located at least in part in the measuring range. An evaluation unit subtracts the variable measured for the substrate from the measured values for the portioned unit and determines a value for the moisture content and/or for the mass or density of the portioned unit from at least one difference using a characteristic map.

In practice, intact capsules exhibit pronounced local maxima in the density signal of the filter. If the capsule is broken, the liquid flavoring substance initially spreads in the filter and subsequently evaporates. The broken capsule shell remains at the position of the capsule. Depending on the size and nature of the capsule and its shell, as well as depending on the degree of its destruction, the capsule shell left behind results in one or more density signals. Using the amplitude of the density signal, it is possible to reliably identify defective capsules in the filter. The filter can therefore be discarded from production in the event of a defective capsule. However, it is not possible to reliably distinguish whether a capsule is missing or whether the capsule has already been destroyed. Therefore, the capsule defects for a missing capsule and for a destroyed capsule cannot be reliably distinguished from one another. There is therefore the technical need to obtain additional information about the capsule and capsule defects in the filter in a reliable manner with little effort.

BRIEF SUMMARY OF THE INVENTION

The object of the invention is to provide a method and a device that reliably allow for precise evaluation of the measurement signals for a capsule defect for a filter of the tobacco processing industry.

An embodiment of a method according to the invention for identifying capsule defects in a filter strand of the tobacco processing industry uses a microwave measurement device that measures the density and/or moisture content of a filter in the longitudinal direction thereof. In a first step, the maximum value of the measured values is compared with a threshold value in a specific region of the measurement profiles. The measured values are in this case indicative of the density and/or moisture content, which means that the values for density and/or moisture content can be determined directly from said measured values or with the aid of additional variables. If the threshold value is undershot, a capsule defect is identified in the filter. For a precise analysis of the capsule defect, a degree of fluctuation for the density and/or moisture content is recorded in a region in front of and/or behind a measurement location. Regions around the target positions of the capsules are taken as the measurement locations. In a second step, the value for the degree of fluctuation determined for the region is compared with a capsule threshold value for the measured values. In the event of the capsule threshold value being exceeded, a broken capsule is identified. In the event of the value being less than or equal to the capsule threshold value, a missing capsule is identified in the filter. In each case, the value for the degree of fluctuation is compared with the capsule threshold value. The selection of the measurement locations is particularly relevant for identifying a missing capsule. A missing capsule can only be identified as a defect if a capsule is supposed to be there. Therefore, target positions or expected positions are selected as measurement locations.

The invention is based on the observation that a broken capsule increases fluctuations in the measurement signals and thus leads to a greater value with regard to the degree of fluctuation than the pure filter, which lacks the capsule and which exhibits a uniform density and thus low degree of fluctuation in the measurement signals without the remains of the broken capsule and/or of the leaked flavoring substance. Due to the fact that the second comparison is not based on the measurement signals for density and/or moisture content themselves, but rather on the degree of fluctuation thereof in the region of the capsule defect, information on the condition of the capsule can be obtained reliably with little technical effort.

In a preferred development, a line of best fit is determined for the measured values in an adjustment region around the measurement location and the degree of fluctuation is determined relative to the line of best fit. The adjustment region may, for example, have a predetermined distance in front of or behind the measurement location. Preferably, the line of best fit is formed by means of linear regression of the measured values in the adjustment region. The use of a line of best fit is based on the insight that moisture content and density fluctuations not caused by the capsule or the contents thereof change locally more slowly and can therefore be well represented by a linear regression.

In a preferred development, the microwave measurement device is designed as a microwave resonator that measures a change in the resonance width and/or a shift in the resonance frequency. The dielectric properties in the microwave resonator change on account of the filter with or without a capsule inserted therein. This leads to a broadening of the resonance curve and to a shift in the resonance frequency thereof. During evaluation of the measurement signals of the microwave measurement device, a change in the width of the resonance curve and a shift in the resonance frequency can be evaluated as a moisture content value and a density value. During evaluation of the signals, the change in the resonance curve is generally recorded relative to the empty resonator. It is also possible to operate a suitable microwave measurement device having two or more resonance modes and to evaluate the change in the signals between the different resonance modes. In general, it is sufficient for the method according to the invention to measure values for density signals and/or moisture content signals and to determine their variations according to the degree of fluctuation within a spatial range.

In an embodiment of the method according to the invention, the value for the degree of fluctuation is determined for a predetermined stretch in the longitudinal direction of the filter. The stretches of this development must be adapted to the expected target positions for the capsules. The predetermined stretch may, for example, be located in front of and/or behind the target position of the capsule for which the measured maxima for density and/or moisture content are below the threshold value. Furthermore, the predetermined stretch may, for example, coincide with the adjustment region for the line of best fit.

In a preferred embodiment of the method, the positions in which the capsules are expected to be in the longitudinal direction are predetermined. This may, for example, result from the manufacturing process of the capsule filter strand itself, for example in that capsules are inserted into the filter at predetermined distances starting at a starting position. The predetermined position may, for example, also be determined using a predefined distance between the capsules in that, for example, the presence of a capsule is measured when a threshold value is exceeded and, from there, the expected positions for additional capsules are determined using given distance values. During the manufacture of the capsule filter strand in the production machine, it is important that the positions of the capsules in the endless capsule filter strand is correct relative to the knife that divides the strand into individual filter rods.

In an expedient development of the method, the value for the degree of fluctuation can be determined in each case in a region in front of and/or behind the expected capsule position. In this approach, the values for the degree of fluctuation are calculated continuously, regardless of whether or not the measured values for density and/or moisture content are below the threshold value. The standard deviation is then also evaluated for a past stretch if the threshold value is undershot.

In a preferred embodiment, the filter is a filter rod that is transported in the longitudinal direction thereof. The filter rod is manufactured from filter tow and transported in one piece before being cut. The filter rod can be inspected on the endless strand, and/or after the filter strand has been cut into individual filter rods. However, the method according to the invention cannot just be used during manufacture, but also to inspect finished cigarettes. In this case, the filter to be measured is the filter piece of the cigarette transported in its longitudinal direction.

The measurement and checking of the finished filter piece on a cigarette preferably takes place in a test station; however, it may in principle also take place within the scope of the manufacturing process for the cigarette.

In the method according to the invention, experiments have shown that the material of the capsule and of the filter as well as the moisture content of the filter have no notable influence on the capsule threshold value, and therefore the capsule threshold value can also be determined regardless of the material of the capsule and filter as well as the moisture content of the filter and does not have to be adapted when the capsule material or filter is changed. Preferably, the value for the degree of fluctuation is determined as the standard deviation.

An embodiment of a device configured to measure capsule defects in a filter of the tobacco processing industry is also disclosed. The device comprises a microwave measurement apparatus and a controller, wherein the controller may also be part of the microwave measurement apparatus. The microwave measurement apparatus measures values that are indicative of the density and/or moisture content in the filter, wherein the controller is designed to compare the measured values with a threshold value and to identify a capsule defect if the threshold value is undershot. As in the case of the method according to the invention, the controller is also designed to reliably distinguish a destroyed capsule from a missing capsule using a comparison of the value for the degree of fluctuation with a capsule threshold value. Preferably, the device is part of a filter rod test station. Equally, the device may be part of a device for manufacturing filters, for example a filter rod machine or a machine that assembles various filter pieces into combination filters (filter rod combiner). Moreover, the device may be part of a device for manufacturing cigarettes, for example a cigarette machine. Preferably, the controller is designed to determine a standard deviation as the value for the degree of fluctuation.

BRIEF DESCRIPTION OF THE DRAWINGS

The present invention will be explained in more detail below with the aid of the figures given below.

DETAILED DESCRIPTION OF THE INVENTION

Figure 1:
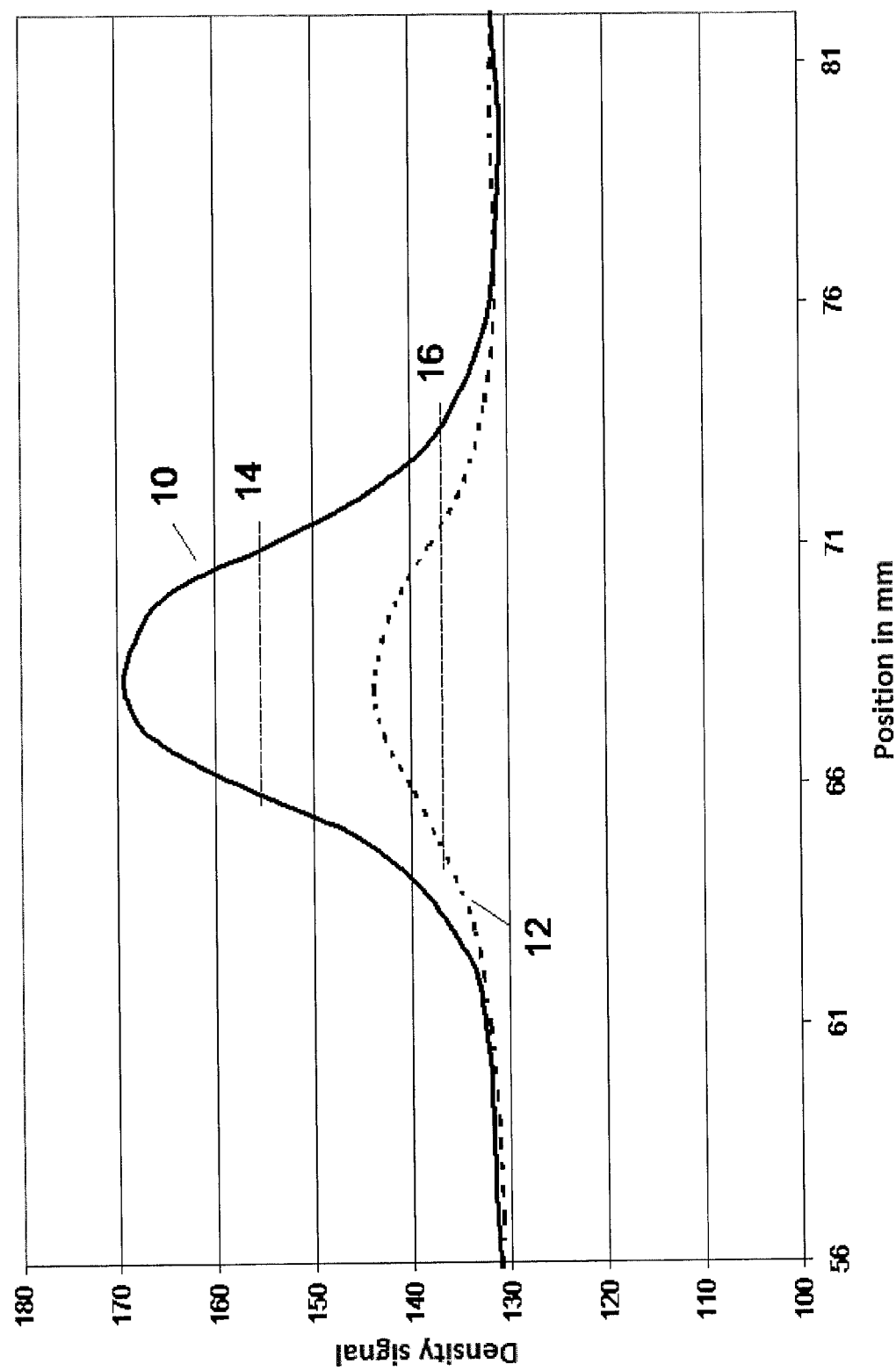
FIG. 1 shows an example of a density signal plotted over the position in a filter strand for an intact and for a broken capsule.

FIG. 1 is a graph showing the measured density value (plotted without dimensions) as a function of a position in millimeters for a filter rod. Two measurement curves have been plotted, wherein the solid measurement curve 10 shows the measured density values for a filter strand having an intact capsule and the measurement curve 12 shows the measured values for the density in the case of a broken capsule. It is clearly visible that, in the range of 56 mm to approximately 61-62 mm and from 76 mm, the two measurement curves have the same density values. In the intermediate region, the intact capsule results in significantly higher measured values of up to 170. The measured values for the broken capsule rise to values of slightly above 140.

The intact capsules can be reliably identified in the filter strand based on an upper threshold value 14 of approximately 158. The measured values of the curve 10 significantly exceed the upper threshold value 14, and therefore an intact capsule is reliably identified. FIG. 1 also shows a lower threshold value 16 having a value of just under 140. In the example shown, the signal for the broken capsule can be discriminated based on the lower threshold value 16.

Figure 2:
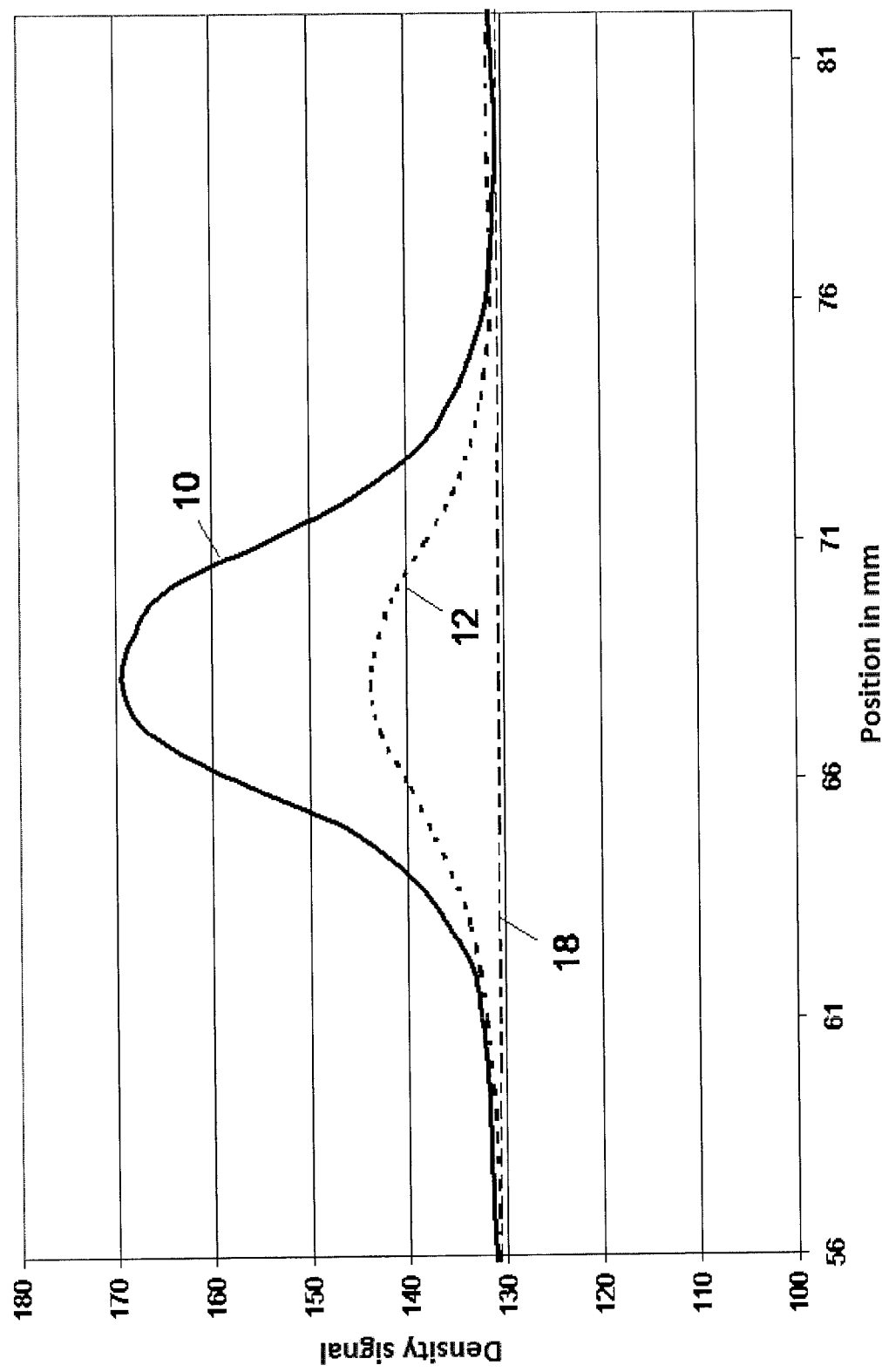
FIG. 2 shows an example of a density signal plotted over the position in a filter strand for a missing capsule.

The method shown in FIG. 1 would in principle also be suitable for identifying the situation with a missing capsule. FIG. 2 shows the course 18 in the case of a missing capsule in the filter strand. The threshold values 14 and 16 shown in FIG. 1 would also be sufficient for distinguishing between a broken capsule and a missing capsule.

However, the method outlined above has a series of serious drawbacks in practice. In particular, when using small capsules, the difference between the signals of missing capsules and of broken capsules are not very great. As a result, it is not possible to reliably distinguish between these capsule defects. Furthermore, in the event of practical use, there are also cases in which the capsules are broken up into various pieces such that, instead of a maximum, various weakly pronounced local maxima occur in the signals. Here, it is not possible to distinguish between missing and broken capsules. The particularly serious drawback from a measurement point of view is that the absolute values of the measured signals are used for both threshold value comparisons. These absolute values vary very significantly depending on the ambient conditions, in particular the moisture content values. If the moisture content in the filter tow changes, the absolute values change significantly, and the same threshold values as for a dry filter tow cannot be used. This prevents practical application of the measurement method with two threshold values and does not allow for a reliable distinction of the capsule defects for missing and for broken capsules.

Figure 3:
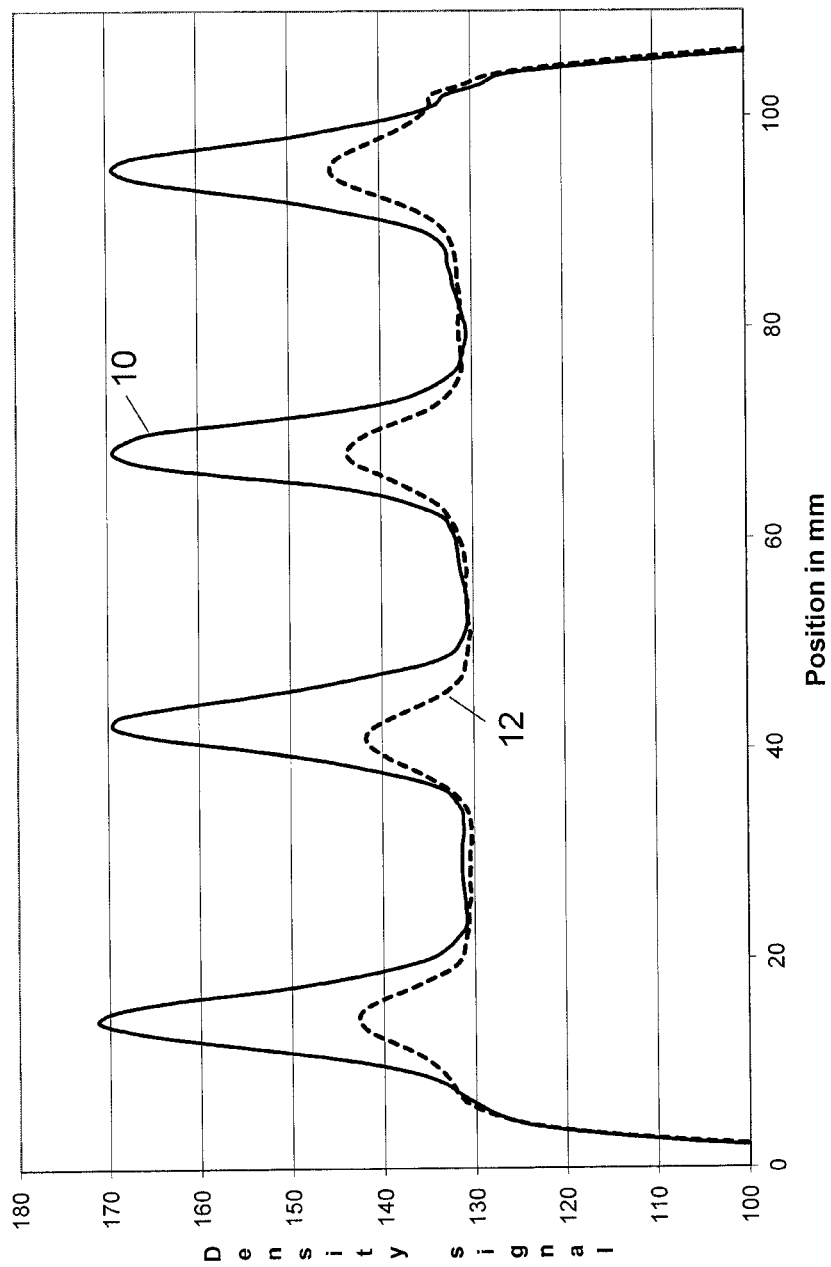
FIG. 3 shows an example of a density signal in a filter rod having four capsules plotted over the position in a filter strand for a missing capsule.

FIG. 3 shows the measured density signals for four capsules located in a filter strand, one signal being for intact capsules and the other being for broken capsules. In this case, the filter rod has already been cut up and comprises four individual filters.

Figure 4:
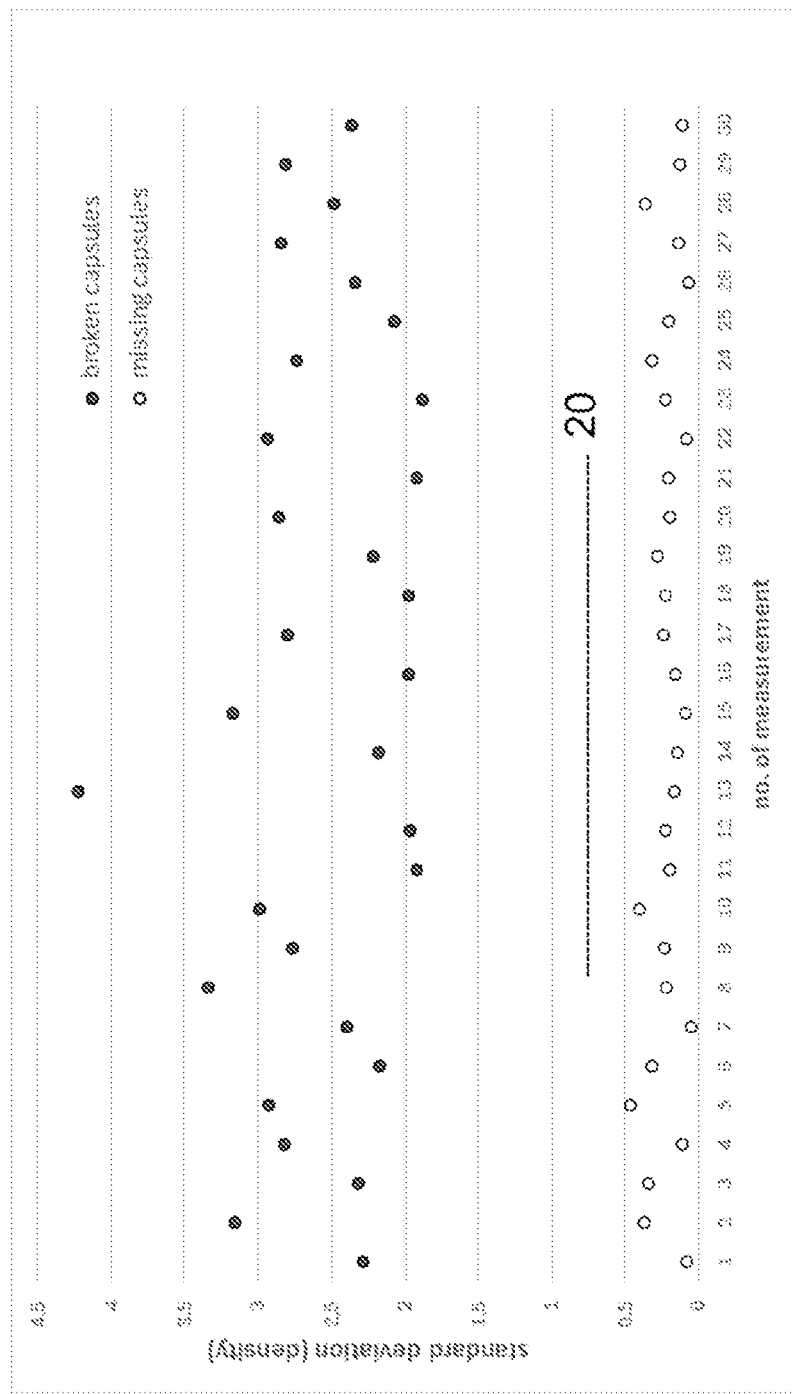
FIG. 4 shows examples of values for the standard deviation in the case of broken capsules and in the case of missing capsules.

In the method according to the invention, a peripheral region is identified as the region having a capsule defect if the threshold value for the measured signal is undershot. The standard deviation of the measured signals is calculated in the peripheral region, for example in a range of +/−10 mm, preferably +/−5 mm. FIG. 4 shows the measured standard deviations for the measured signals. In this case, the standard deviation is measured for each signal, regardless of whether the measured signal is below the threshold value or not. FIG. 4 shows that the determined standard deviations for the signals with a broken capsule are significantly greater than the standard deviations of the signals in the case of a missing capsule. By using the capsule threshold value 20 for the standard deviation, the two capsule defects can be reliably distinguished from one another. The particular advantage of this is also that the values for the standard deviation do not change on account of the ambient conditions and/or the material composition and nature, for example the moisture content of the filter tow. This means that the capsule threshold value 20 can be used uniformly for a wide range of applications. Even small capsules do not prevent reliable distinction of the two capsule defects.

Overall, the use of the standard deviation has a series of advantages: A larger relative difference between the signals of broken and missing capsules can be observed for smaller capsules, in particular. The distinction of the shadow images can thus be done with higher precision. In addition, the distinction between broken and missing capsules does not depend on the absolute values and can therefore be used regardless of the filter tow density and moisture content.

Figure 5:
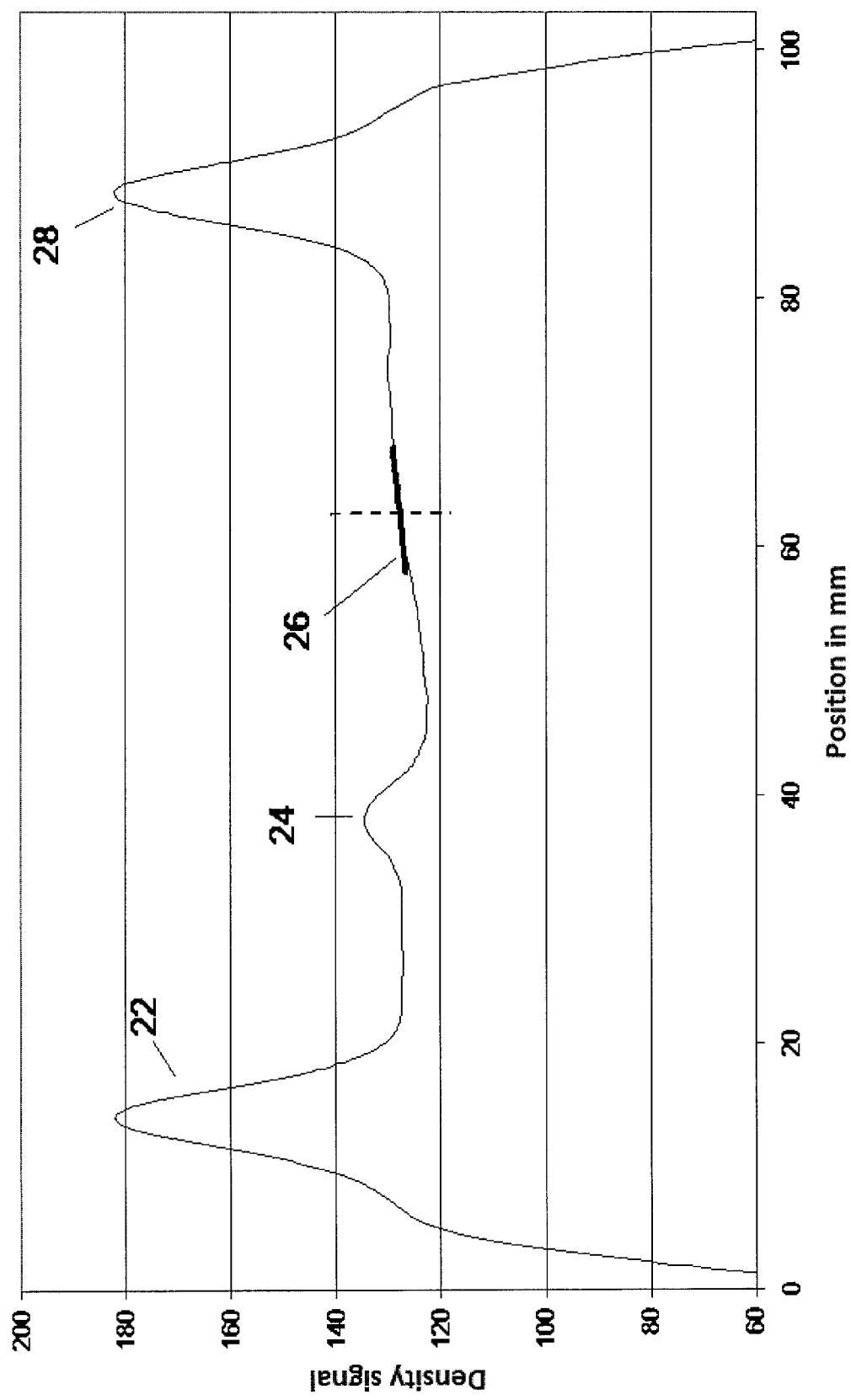
FIG. 5 shows an example of density values for intact and broken capsules as well as a line of best fit for a missing capsule.

FIG. 5 shows the measured density of the filter tow. Two maxima for the density values are shown with the signal values 22 and 28. The maxima 22 and 28 indicate the presence of intact capsules. The signal value 24, with its lower value, indicates a broken capsule.

A missing capsule can be easily identified using the calculation of the standard deviation relative to the mean value of the density of the filter tow, in particular in the case of a homogeneous density of the filter tow of the filter. However, in the case of an inhomogeneous density of the filter tow, the standard deviation increases and is only suitable to a limited extent for detecting missing capsules. In an advantageous development, a line of best fit is determined for the measurement points in the region around the target position by means of linear regression. The line of best fit 26 shows, for example, a trend in the density of the filter tow. The degree of fluctuation of the measured values relative to the line of best fit is, in this case, a suitable criterion for distinguishing broken and missing capsules.

FIG. 5 shows a filter rod of 100 mm in length and that should contain 4 capsules. Two of the capsules in the positions 22 and 28 are intact, one capsule in position 24 is broken and one in position 26 is missing. The density of the filter tow in the region between approx. 50 mm and 80 mm is inhomogeneous and increases monotonically in this region. The standard deviation of the density relative to the density mean value would be increased in this region, even though no broken capsules are present. In the image, a line of best fit 26 can also be seen around the target capsule position (+/−5 mm). The degree of fluctuation of the measured values with respect to said line of best fit is low. The reason for this is that, in the presence of a broken capsule, non-monotonic signal deviations would occur, which would increase the degree of fluctuation of the measured values even with respect to the line of best fit.

The invention claimed is:

1. A method for identifying capsule defects in a tobacco filter, comprising:
    measuring values for at least one of a density and a moisture content of the tobacco filter along a longitudinal direction of the tobacco filter using a microwave measurement device;
    comparing the measured values with a threshold value;

determining a presence of a capsule defect in the filter if the measured values undershoot the threshold value;

determining a value for a degree of fluctuation of the measured values in at least one of: (i) a region in front of a measurement location; and (ii) a region behind the measurement location in which at least one measured value is below the threshold value, comparing the value for the degree of fluctuation with a predetermined capsule threshold value, wherein, the capsule defect is a broken capsule when the value for the degree of fluctuation exceeds the capsule threshold value, and the capsule defect is a missing capsule when the value for the degree of fluctuation undershoots the capsule threshold value.

2. The method according to claim 1, further comprising:
plotting a best fit line for the measured values in an adjustment region around the measurement location; and determining the degree of fluctuation relative to the best fit line.

3. The method according to claim 2, further comprising structuring the microwave measurement device as a microwave resonator configured to measure at least one of: (i) a shift in a resonance frequency; and (ii) at least one change in a width of a resonance curve.

4. The method according to claim 2, further comprising structuring the microwave measurement device as a microwave resonator configured to measure at least one of: (i) a density signal; and (ii) a moisture content signal.

5. The method according to claim 2, further comprising determining the value for the degree of fluctuation for a predetermined length of the region in the longitudinal direction.

6. The method according to claim 2, wherein capsules in the tobacco filter are expected to be in specific positions along the longitudinal direction.

7. The method according to claim 6, wherein the determining the value for the degree of fluctuation is done in an interval around an expected position of one of the capsules.

8. The method according to claim 2, further comprising structuring the tobacco filter as a filter rod configured to be transported in the longitudinal direction.

9. The method according to claim 2, further comprising structuring the tobacco filter as a filter strand.

10. The method according to claim 2, further comprising structuring the tobacco filter as a filter piece of a cigarette configured to be transported in the longitudinal direction.

11. The method according to claim 2, wherein the predetermined capsule threshold value is independent of at least one of: (i) a material of a capsule; and (ii) a type of capsule filling.

12. The method according to claim 2, wherein the predetermined capsule threshold value is independent from a surrounding filter tow.

13. The method according to claim 1, further comprising finding a maximum value in an area surrounding the measurement location.

14. A device for measuring capsule defects in a tobacco filter, comprising:

a microwave measurement apparatus configured to measure values for at least one of: (i) a density of the tobacco filter; and (ii) a moisture content of the tobacco filter; and a controller in communication with the microwave measurement apparatus configured to, process the measured values, compare the measured values with a threshold value, identify a capsule defect if the measured values undershoot the threshold value, determine a value for a degree of fluctuation for the measured values in a region that is at least one of: (i) in front of a measurement location; and (ii) behind the measurement location, in which at least one measured value is below the threshold value, and compare the value for the degree of fluctuation with a capsule threshold value, wherein, the capsule defect comprises a broken capsule when the value for the degree of fluctuation exceeds a predetermined capsule threshold value, and the capsule defect comprises a missing capsule when the value for the degree of fluctuation undershoots the predetermined capsule threshold value.

15. A filter rod test station comprising the device according to claim 14.

16. A production machine comprising the device of claim 14, wherein the production machine is configured to produce one of: (i) cigarettes; and (ii) filters.

* * * * *